E. R. CARICHOFF.
ELECTRIC TRAIN DISTRIBUTION.
APPLICATION FILED MAR. 24, 1913.
1,105,754.
Patented Aug. 4, 1914.
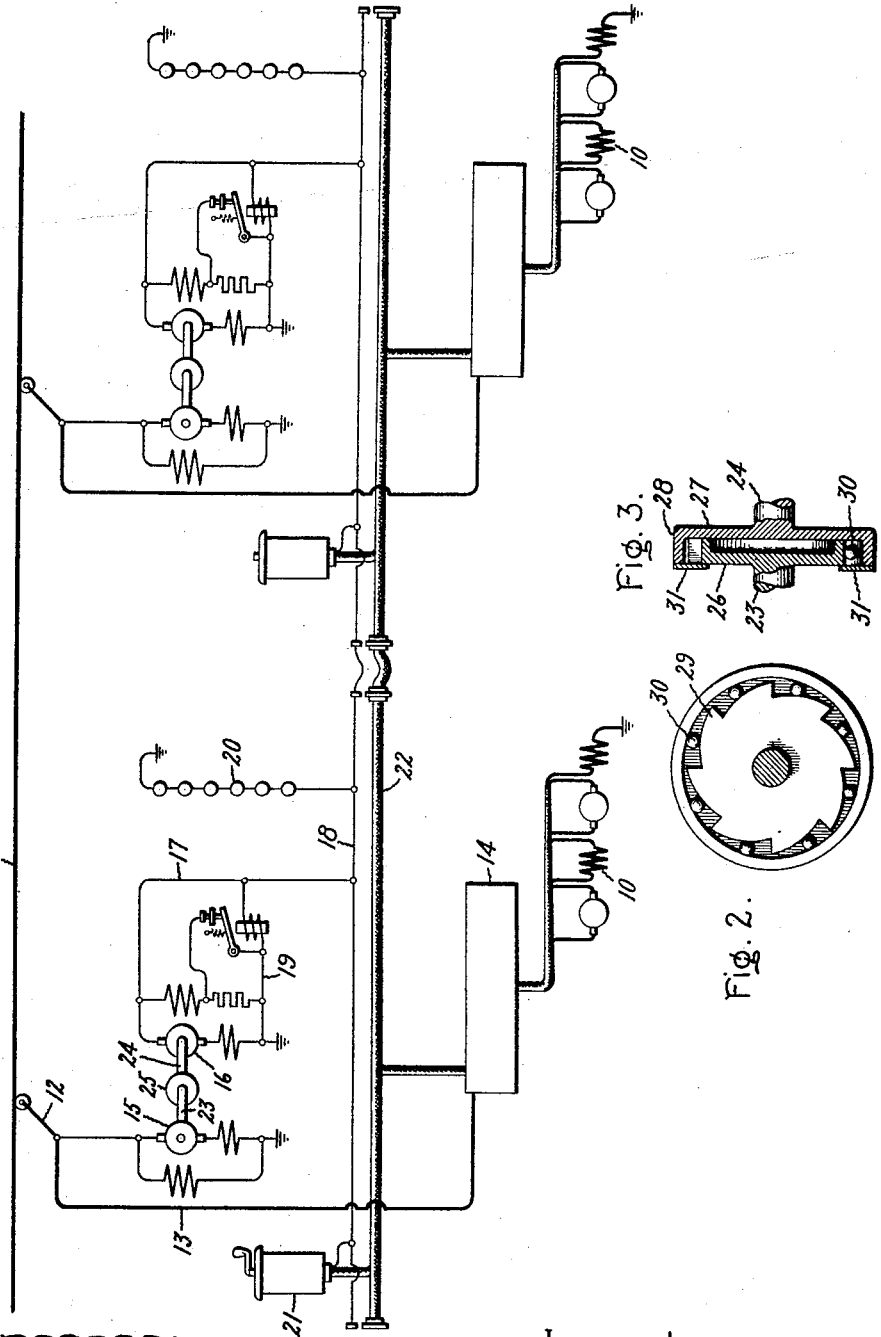
Witnesses:
Earl G. Klock.
J. Ellis Glenn.
Inventor:
Eugene R. Carichoff,
by
His Attorney.
THE NORRIS PETERS CO., PHOTO-LITHO., WASHINGTON, D. C.

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

ELECTRIC TRAIN DISTRIBUTION.

1,105,754. Specification of Letters Patent. Patented Aug. 4, 1914.

Application filed March 24, 1913. Serial No. 756,398.

*To all whom it may concern:*

Be it known that I, EUGENE R. CARICHOFF, a citizen of the United States, residing at Schenectady, in the county of Schenectady, State of New York, have invented certain new and useful Improvements in Electric Train Distribution, of which the following is a specification.

My invention relates to electric distribution systems which comprise means for transforming electric energy from one voltage to another, and more particularly, to systems of that character which are adapted for the control and lighting of trains of electrically propelled cars. It is necessary in many cases to supply electric energy at a comparatively high voltage, for instance, 1200 volts, to the driving motors of the respective cars constituting the train. Under such conditions, it is necessary to include in the system a means for transforming that portion of the electric energy which is to be used for the operation of the controlling device and the lights to a lower voltage, for example, 600 volts. Ordinarily a dynamotor is utilized as the transforming device. As the circuit including the dynamotor or other transforming device is supplied through the trolley, it is necessary to connect the ends of the transforming devices in the respective cars in parallel so that the load will be taken by the machines in the other cars when the trolley of any one is removed. With such an arrangement, if a dynamotor or a motor generator as ordinarily constructed be used as the transforming device, the complication arises that when the supply of energy to the motor end of a transforming device fails due to removal of the trolley or for any other reason, the generator end of that transforming device will be run as a motor by the energy supplied by the machines in the other cars. This will result in the supply of energy from what was previously the motor end of the device at the higher voltage to the driving motor of the car. This may cause severe damage to the transforming device by overloading since the driving motor has a very low resistance.

The object of my invention is to overcome in a simple manner the difficulties above set forth. According to my invention, means are provided whereby, when the trolley of any car is removed the transforming device of that car is prevented from supplying energy to any other electric circuit in the car.

In the preferred form of my invention, each of the cars constituting a train is provided with a transforming device consisting of a motor generator set and the generator ends of these machines are connected in parallel. The driving connection of each set is however such that the motor may drive the generator but the generator, if it should be run as a motor, cannot drive as a generator what is properly the motor of the set. This driving connection may be of any of the well-known one-way driving mechanisms.

My invention will be more clearly understood by referring to the drawings in which—

Figure 1 is a diagrammatic view of the electric circuit connections of a train consisting of two cars and equipped with my invention; Fig. 2 is an elevation partially in section of a one-way drive which may be used as part of my invention, and Fig. 3 is a vertical section of the same.

Referring to the drawing, it will be seen that the circuit connections of the respective cars are identical. In each car the motor 10 is supplied with energy from the trolley wire 11 through the trolley 12, lead 13 and the contacting devices (not shown) in the contactor box 14. The motor 15 which may be compound wound is connected in shunt with the circuit of the motor 10 and drives the generator 16, which may be also compound wound and is connected by the lead 17 to the bus 18. The generator 16 may be provided with a vibrating regulator 19 of a type well known in the art. The bus 18 is connected to the generators 16 in each of the cars of the train and the series of lamps 20 in each car is connected to the said bus and to the ground. The controllers 21 are connected in multiple with the bus 18. The bus 18 is located outside of the cable 22 so there will be no danger of accidental connection to the conductors leading to the contacting devices in box 14. The shafts 23 and 24 of the motor 15 and the generator 16 respectively are connected by the ball clutch 25 which is of a type well known in the art. As shown in Figs. 2 and 3, it comprises a ratchet wheel 26 fast to the shaft 23 and a disk 27 fast to the shaft 24. The latter is provided with an annular flange 28, between which and the teeth 29 of the ratchet wheel gripping balls 30 are located. A strip 31 serves to hold the said balls in place.

Energy is supplied at 1200 volts, for example, from the trolley wire 11 to the driving motors of the cars and also to the motors 15 in shunt therewith. As long as the energy is supplied in the usual way to the motors of each car, the motor 15 will drive the generator 16, the balls 30 being wedged between the adjacent faces of the teeth 29 and the flange 28. The generators 16 in the respective cars, being connected in parallel through the bus 18, furnish the requisite energy at, for example, 600 volts, for the operation of the controlling devices 21 and the lights 20, which as shown, are six in number in each car and are connected in series thereby taking 100 volts each. Should the trolley of any one of the cars be removed from the wire 11 the cessation in the supply of energy to the motor 15 in that car will cause it to cease to drive the generator 16. The generator 16 may then be driven as a motor by reason of its connection with the bus 18. However, it will not drive the motor 15 as a generator because with the disk 27 as the driving member of the clutch the balls 29 will be carried so that they will be in the larger portions of the spaces between the flange 28 and the teeth 29. It will be seen therefore there will be no danger of current being generated at the higher voltage and an overload on the machine 15 caused by the supply of energy through the motors 10.

Although I have shown a ball clutch between the motor 15 and generator 16, it is to be understood that other one-way drives well known to the art may be substituted therefor.

Various other changes and modifications may be made in the above described structure without departing from the spirit of my invention, the scope of which is set forth in the following claims.

What I claim as new and desire to secure by Letters Patent of the United States, is:—

1. In a train consisting of a plurality of cars, each provided with a driving motor, a distribution system in shunt with the supply circuit of each of the said driving motors, and comprising a transforming means consisting of a motor and a generator driven thereby, means for electrically connecting the several generators and means for preventing the transforming devices from supplying energy to the circuit of the driving motor.

2. In a train consisting of a plurality of cars, an electric distribution system comprising a motor and generator driven thereby for each car, means for electrically connecting the generators and means for preventing any of the motors from being driven as generators upon the failure of a supply of energy thereto.

3. In a train consisting of a plurality of cars, each provided with an electric driving motor, a distribution circuit supplied from the same source as said motor and comprising a motor and a generator driven thereby for each car, means for electrically connecting the several generators and means for preventing any of the motors from being driven as generators upon the failure of a supply of energy thereto.

4. In a train consisting of a plurality of cars each provided with an electric driving motor and a trolley whereby energy is supplied thereto, a distribution system also supplied through said trolley and comprising a motor and a generator driven thereby for each car, means for electrically connecting the several generators and means for preventing any one of the motors from being driven as a generator upon the removal of the trolley of the car on which it is mounted.

5. In a train consisting of a plurality of cars each provided with a driving motor and a trolley whereby energy is supplied thereto, a distribution system in shunt with the supply circuit of each of said driving motors and comprising a transforming means consisting of a motor and a generator, means for electrically connecting the several generators and means for preventing the motor of the transforming device of a car from being driven as a generator upon the failure of the supply of energy to the said motor.

6. In a train consisting of a plurality of electrically driven cars, a transforming device on each car comprising a motor and a generator, means for electrically connecting the several generators, each of the elements of the transforming device being provided with a rotor shaft, and a one-way driving means connecting said shafts for preventing any of the motors from being driven as generators upon failure of the supply of energy thereto.

7. In a train consisting of a plurality of cars, an electric distribution system on each car including a transforming device consisting of a motor and a generator, said motor being adapted to receive energy from a source of supply, means for electrically connecting the several generators, said motor and generator being each provided with a rotor shaft and a one-way driving means connecting said shafts for preventing any of the motors from being driven as generators upon the failure of the supply of energy thereto.

In witness whereof, I have hereunto set my hand this 21st day of March 1913.

EUGENE R. CARICHOFF.

Witnesses:
 BENJAMIN B. HULL,
 HELEN ORFORD.

Copies of this patent may be obtained for five cents each, by addressing the "Commissioner of Patents, Washington, D. C."